(12) United States Patent
Moona et al.

(10) Patent No.: US 7,552,481 B2
(45) Date of Patent: Jun. 23, 2009

(54) METHOD OF ASSESSING AN ORGANIZATION'S NETWORK IDENTITY CAPABILITY

(75) Inventors: Sanjay K. Moona, Saratoga, CA (US); Kevin Welsh, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1493 days.

(21) Appl. No.: 10/392,477

(22) Filed: Mar. 17, 2003

(65) Prior Publication Data

US 2003/0177121 A1 Sep. 18, 2003

Related U.S. Application Data

(60) Provisional application No. 60/365,573, filed on Mar. 18, 2002.

(51) Int. Cl.
*G06F 7/04* (2006.01)
*H04K 1/00* (2006.01)

(52) U.S. Cl. .............................. 726/26; 713/182; 726/2

(58) Field of Classification Search ................... 726/26, 726/2; 713/182
See application file for complete search history.

(56) References Cited

U.S. PATENT DOCUMENTS

| | | | |
|---|---|---|---|
| 6,487,665 B1 * | 11/2002 | Andrews et al. | 726/26 |
| 6,519,571 B1 * | 2/2003 | Guheen et al. | 705/14 |
| 6,871,232 B2 * | 3/2005 | Curie et al. | 709/225 |
| 7,089,584 B1 * | 8/2006 | Sharma | 726/4 |
| 7,185,192 B1 * | 2/2007 | Kahn | 713/155 |
| 7,289,964 B1 * | 10/2007 | Bowman-Amuah | 705/1 |
| 7,340,438 B2 * | 3/2008 | Nordman et al. | 705/64 |
| 7,349,912 B2 * | 3/2008 | Delany et al. | 707/101 |
| 2002/0016777 A1 * | 2/2002 | Seamons et al. | 705/76 |
| 2002/0188869 A1 * | 12/2002 | Patrick | 713/201 |
| 2003/0069887 A1 * | 4/2003 | Lucovsky et al. | 707/10 |
| 2003/0084168 A1 * | 5/2003 | Erickson et al. | 709/229 |
| 2003/0131073 A1 * | 7/2003 | Lucovsky et al. | 709/219 |
| 2007/0220268 A1 * | 9/2007 | Krishnaprasad et al. | 713/182 |
| 2007/0271598 A1 * | 11/2007 | Chen et al. | 726/4 |

* cited by examiner

*Primary Examiner*—Matthew B Smithers
*Assistant Examiner*—Techane J Gergiso
(74) *Attorney, Agent, or Firm*—Park, Vaughan & Fleming LLP

(57) ABSTRACT

A method of determining an organization's network identity capability. The organization's relationships with its employees, customers and business partners, and the organization's technological infrastructure, are examined. By examining the organization's use of identity data (e.g., data identifying customers, employees), the organization's management of that data, and the technology infrastructure can be redesigned to enable better network identity capability. Improved network identity capability enables users' access to multiple applications or services through a single authentication process (e.g., a single login or sign-on), device-independent access to those applications and services, greater protection for the data, improved business processes and collaborations with business partners, etc.

10 Claims, 3 Drawing Sheets

METHOD OF ASSESSING AN ORGANIZATION'S NETWORK IDENTITY CAPABILITY

RELATED APPLICATION

This application claims the benefit of U.S. Provisional Application No. 60/365,573, filed Mar. 18, 2002.

BACKGROUND

This invention relates to the fields of computer systems and information management. More particularly, a method is provided for assessing the network identity capability of an organization or enterprise.

In many organizations, business managers are constantly challenged by the opportunities and threats of a changing business landscape. Their Information Technology (IT) peers are equally concerned with providing optimal IT solutions and establishing a technology infrastructure that enables the organization to remain agile.

The increasing use of the Internet and other computing and communication technologies (e.g., PDAs—Personal Digital Assistants, smart telephones) seems to promise expanded business opportunities and continued technology uncertainties for business managers. They need seamless, trusted and real-time interaction with employees, customers, and business partners. However, in many organizations, identity information for employees, customers, and partners is distributed across many incompatible applications and may be under the control of numerous internal and external groups. This often results in redundant entries, inconsistent data, and uneven security policies. In addition, the use of dedicated business processes and technology to manage different user and device dependencies prevents flexibility and increases operational costs.

Thus, what is needed is a method of combining or coupling identity data so that the data are no longer permanently tied to just one particular service or application that uses the data. Instead, identity data can be shared among multiple entities (e.g., people, processes, devices).

SUMMARY

In one embodiment of the invention, a method of determining an organization's network identity capability is provided. The organization's relationships with its employees, customers and business partners are examined, along with the organization's technological infrastructure. By examining the organization's use of identity data (e.g., data identifying customers, employees), the organization's management of that data, and the technology infrastructure can be redesigned to enable better network identity capability. Improved network identity capability enables users' access to multiple applications or services through a single authentication process (e.g., a single login or sign-on), device-independent access to those applications and services, greater protection for the data, improved business processes and collaborations with business partners, etc.

In an embodiment of the invention, an assessment of an organization's network identity capability allows it to be initially classified into one of multiple categories. A multi-step approach may then be taken to identify how to improve the organization's network identity capability. The initial assessment may require investigation of many aspects of the organization's operational and technological capabilities, and may be divided to separately target the organization's relationships with employees, customers and business partners or affiliates.

In another embodiment of the invention, a software tool is implemented to facilitate an assessment of an organization's network identity capability. Personnel in the organization complete surveys that present questions or assertions regarding various network identity capabilities in the respondents' areas of the organization. They indicate the extent to which they believe the organization realizes the benefit(s) associated with the capabilities. From the survey data, the current network identity capability can be determined for the overall organization as well as individual areas of the organization.

In addition, the tool allows personnel to prioritize various benefits of network identity capability, and can compare the results to identity any inconsistencies (e.g., between the organization's priorities and the priorities of people within the organization). Performance ratios may be generated to indicate how well the organization is achieving its priorities.

DETAILED DESCRIPTION

Figure 1:
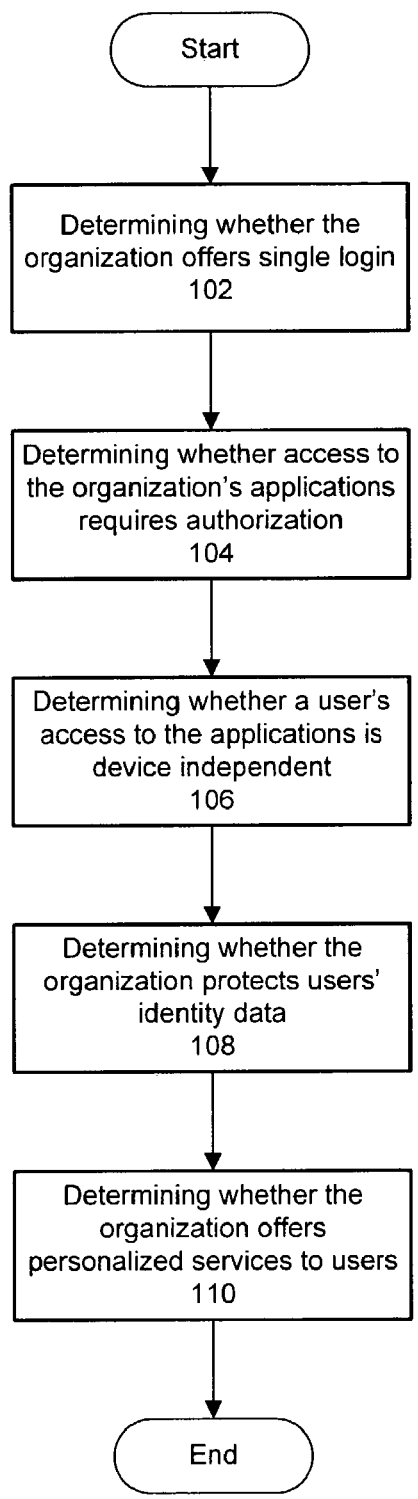
FIG. 1 is a flowchart demonstrating a method of assessing an organization's network identity capability, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

Introduction

In an embodiment of the invention, a method of assessing the network identity capability of an organization's data computing and communication environment (e.g., intranet, local area network, wide area network) is provided. In another embodiment, a computer readable medium is provided, comprising a method of assessing an organization's network identity capability in a form that is executable by a computer system.

Illustratively, network identity comprises context-sensitive identity (e.g., of a user, an organization), attributes, rights and privileges, all of which are maintained within a trusted, policy-based network framework. Managing an organization's network identity capability may therefore involve the management of computing equipment (e.g., hardware and software) and business processes that use this type of information.

Providing network identity capability within an organization benefits employees, customers and partners of the organization. Managing network identity adequately allows the organization to serve these entities better and, as a result, brings value to the organization.

For example, employees may benefit by gaining the ability to access multiple applications (e.g., employee benefits, office supply ordering) through a single sign-on or login procedure. The applications may be better integrated, and a uniform security policy may be applied. Particular improvements may be made in the areas of human resources, financial applications, sales force management, etc.

Customers may benefit when the organization is better able to accumulate and use customer information. Marketing may be focused more sharply to the customer's needs, and services offered to the customer may be more tightly integrated and protected. In particular, network identity may improve the organization's customer relationship management and/or electronic commerce applications.

For business partners, an organization's improved network identity capability may help provide business relationships that are more tightly integrated while decreasing the risk of fraud. Within the organization, business-to-business applications such as supply chain management, customer relationship management and accounts payable may be particularly improved.

In one embodiment of the invention, effective network identity enables the creation of trusted relationships among entities. For example, a set of consumers and merchants may agree to rely on a set of trusted identity providers or managers to provide authenticated information on the consumers and/or the merchants. A consumer controls his or her own identity, and may choose an identity provider to maintain that identity. Merchants agree to accept identities from that provider in transactions. Use of this trusted relationship among the participating consumers, merchants and identity providers can help reduce theft and invasions of privacy, and simplify identification and authentication. Although no single entity possesses all the attributes of an identity, the entities bring together the necessary pieces to conduct a transaction.

This model may be extended as needed. Thus, if a consumer develops a need to conduct a transaction with a merchant that he or she has no experience with, if the merchant has a trusted relationship with the consumer's identity provider or manager, or a trusted relationship with some other entity that has a trusted relationship with that identity provider, the transaction can be conducted with confidence.

A Method of Assessing Network Identity Capability

In an embodiment of the invention described herein, effective network identity capability requires significant attention to several areas, including management, authentication, authorization and protection. Effective management of network identities involves the establishment of one or more authoritative sources for identity information (e.g., an identity service provider). Identity management also requires the creation of identity-based business practices and organization-wide identity data characteristics. Thus, network identity management is concerned with how an identity is created, and how it is stored and leveraged within an organization.

Effective identity authentication establishes a single point of validation of a network identity, through an organization-wide authentication process. An identity may be validated, for example, through the association of something a user is, has or knows. Identity authentication allows an organization to use a single validation source to identify all users, regardless of platform or application. By using a centralized location, consistent and stringent policies can be applied, thereby enhancing security.

Effective identity authorization necessitates organization-wide role-based access controls. Business roles and job requirements may be leveraged. Access rights are maintained through the application of appropriate policies, standards and/or regulatory compliance. Network identity authorization enables more timely maintenance of access rights, while decreasing the amount of time needed to administer user data.

Effective identity protection ensures a secure identity solution, from authoritative source to entitlement. Integrated layers of increasing protection may be applied, based on identity.

Network identity capabilities of different organizations may be characterized by different phases. In each phase, an organization's business and technology profiles exhibit different characteristics. Business characteristics may include relationships with the organization's employees, customers and/or business partners. By investigating its business and technology characteristics, an organization's network identity capability can be assessed. Such an assessment can help locate areas that need additional effort as well as areas that are already promoting effective network identity usage.

A first, ineffective, phase of network identity may be generally marked by multiple, mutually exclusive relationships with other entities (e.g., merchants, partners, customers). A separate profile must be maintained for each entity, and integrated services are difficult, if not impossible, to provide or obtain.

More specifically, in this phase an organization's relationship with employees exhibits a lack of integrated sharing of data, and employees typically have the burden of collating data across different applications. Regarding its customers, the organization is likely unable to offer one-stop service, and may be forced to divulge personal information in order to conduct business transactions. Further, the existence of multiple customer identity sources and administrators may make it difficult to mine customer data and limit the effectiveness of customer relationship management. As a result, customer trust in the organization's collection and use of customer identity data may suffer.

As for the organization's business partners or affiliates, the sharing of information may be contractual in nature, and may be arranged on a case-by-case basis. There may be difficulty in changing suppliers because the organization's suppliers may be deeply interwoven into the organization's business processes. The organization's technical characteristics in this first phase may be marked by the use of client/server architectures and/or standalone personal computer applications.

Simple user ID schemes may be in use, along with cookies for increasing identity efficiency. Communication services (e.g., electronic date interchange) may be dedicated to applications and partner enterprises. Delivery mechanisms (e.g., computing or communication devices) may be hard-wired into application logic.

This situation is somewhat improved in a second phase of network identity characterized by the use of identity linking with mutual consent. In this phase, some "identity" is shared with other entities (e.g., other merchants), which may require a user's (e.g., consumer's) approval. As a result, the organization may obtain one or more affiliates, and a consumer may become familiar with those affiliates without having direct contact.

In this phase, an organization's employee relationships involve some sharing of data through hard-wiring applications, which reduces the employees' burden of collating data. The organization's customers allow merchants to share their identity information with affiliates, but merchants may not be able to control how their partners use the information. Customers may consent to the sharing of identity information, but cannot control its dissemination, and may feel intruded upon if/when details of the consent process are not fully disclosed. However, customers may benefit from expanded service offerings through referrals to an organization's affiliates.

Merchants and partners may leverage the customer base through this sharing of customer identities, and streamline business processes through real-time exchange of information. The sharing of customer identities may enable cross-marketing and referrals. Unfortunately, once an identity is shared, it cannot be retracted. In the organization's technological profile, the client/server model is enhanced by customer connectors and adapters and possibly one or more monolithic applications. The benefit of eliminating some dedicated communications that are no longer needed may be undermined by the need for increased administration and more complex security. Context-based services may be achieved through the use of complex mechanisms.

In a third phase marked by "circles of trust," network identity becomes a reality. A trusted identity provider or manager is relied on to provide authenticated identity information, thereby obviating other entities (consumers, the organization, the organization's affiliates) from having to maintain such information. A group of entities (e.g., consumers, merchants, identity provider) that facilitate transactions among themselves may comprise a "circle of trust."

In the third phase, employee applications share data seamlessly, and web services can be rolled out on demand, and are easy to administer and independent of location and devices. Services are authorized through a role-based policy, and the level of effort needed to administer identities is minimized. Business partners trust the identity and authentication of each other's employees and roles. Regarding customers, the burden of identifying and authenticating is reduced without losing control of interaction with customers. An organization gains the ability to provide interrelated services and packaged products to a customer, through partners or affiliates, without the risk of losing the customer. Customer data can be integrated to provide full views of customers, which can then be offered context-based services.

As for business partners, an organization attains the ability to make relevant information transparent with trusted partners, in real-time, to increase transaction throughput. The organization's business can be extended to allow partners to participate in internal processes. Technologically, the organization employs a peer-to-peer computing model within a circle of trust, using a single login capability. Open, standard protocols may be employed (e.g., SOAP, XML, SAML). Applications are device and platform-independent, and true web services are enabled.

In a fourth phase of network identity capability, entities within one circle of trust may establish and use trusted relationships with entities in other circles of trust. This may give rise to federated network identity services and provide significant mobility for identities.

In this final phase, an organization's portfolio of employee applications comprises a hybrid of internal and outsourced applications, with complete peer-to-peer data sharing. The workforce is extended through outsourced partners and services, thereby leveraging individual partners' resources. Employee relationships are marked by the ability to create a collaborative work environment that eliminates duplication of work and maximizes employee productivity. Customer relationships may be characterized by the ability to mine data in an anonymous manner and the ability to provide customer-defined products and services through affiliations and partnerships.

In this phase, partner relationships, affiliations and supplier sources are further extended to increase profitability. An organization's peer-to-peer computing model is extended to allow for seamless deployment of web services using emerging technologies. Federated network identity trust processes and services are implemented.

In an embodiment of the invention, a tool is provided to assist an organization with an assessment of its network identity capability. The tool may be modified as necessary for different industries or sectors of the economy.

One implementation of the tool facilitates exploration of the organization's relationships with, and operational capabilities relating to, employees, customers and business partners. In this implementation, various business and technological benefits that may be achieved in a network identity capable environment may be measured. Table 1 defines business-related benefits, while Table 2 defines technological benefits.

TABLE 1

| Business Benefit | Definition |
|---|---|
| B1. Device Independence | Functionality and services are delivered independently of the device used to access them. |
| B2. Ease of Management | Streamlined management and efficient communication between employees, customers and partners. |
| B3. Ease of Integration | Ability to offer services that are not restricted by operational or technology constraints. |
| B4. Increased Intelligence | Ability to deepen relationships with employees, customers and partners by learning more about them in a non-intrusive manner. |
| B5. Personalized Service | Ability to provide context-sensitive, timely services to enhance customer experience. |
| B6. Privacy Protection | Privacy ensured via privacy policies and the ability to provide identity information at the time of engagement. |
| B7. Secure Access | Fully authenticated and authorized access. Trust relationship is complete. |
| B8. Single Login or Sign-on | Allows a user to access all applications and services via a single user ID/password. |

TABLE 2

| Technological Benefit | Definition |
|---|---|
| T1. Choice and Control | The flexibility to integrate and incorporate applications without increasing administrative overhead. |
| T2. Financial and Effectiveness | Reduced costs and improved ROI as well as better management of resources. |
| T3. Interoperability and Efficiency | Improved productivity in managing and deploying applications. Reduced time to market for services. |
| T4. Risk Management | Reduced risks of identity theft and fraudulent transactions. |
| T5. Security and Provisioning | Integrated security. |

Illustratively, the business and technological benefits of Tables 1 and 2 may be explored by examining aspects of the organization that are related to the benefits. Table 3 presents a matrix identifying illustrative operational capabilities and the business benefits of Table 1 that affect those capabilities. The operational capabilities are presented in the form of queries and, as indicated, may be divided into Employee, Customer and Business Partner categories. By determining whether the indicated benefits are being realized or applied for each operational capability, an accurate picture of the organization's current network identity capability can be drawn. Table 4 matches operational capabilities with the technological benefits of Table 2.

TABLE 3

| Operational Capability | Network Identity Business Benefit |||||||||
|---|---|---|---|---|---|---|---|---|
| | B1 | B2 | B3 | B4 | B5 | B6 | B7 | B8 |
| Employees | | | | | | | | |
| Do employees need only a single login to access all applications? | • | • | • | | • | | • | • |
| Are all applications delivered through a unified portal? | • | • | • | • | • | | • | |
| Are employees able to pull together information "on-the-fly"? | | • | • | • | | | | |
| Can secure access to organizational resources be granted in a single-step process, within 24 hours? | | • | | | | | | |
| Can an employee be added or removed in a single-step process within 24 hours? | | • | | | | | | |
| Is employee provisioning provided on the basis of assigned roles? | • | • | • | • | | | • | • |
| Are comprehensive customer interaction histories available to customer service representatives? | | • | | • | • | | | |
| Does the organization have complete knowledge of who has access to applications, services, content and other resources? | • | • | • | • | | • | | |
| Can employees access organizational information from multiple devices? | • | • | • | • | • | | • | |
| Can the organization accommodate new access devices within one week? | • | • | • | | | | | |
| Is employee confidentiality protected by providing secure access to such information? | • | | | • | • | • | | |
| Are (approved) external entities able to offer personalized services to employees? | • | • | • | • | • | • | • | |
| Customers | | | | | | | | |
| Do customers trust the organization with their personal data? | | | | • | | • | • | • |
| Are customers forced to provide identity information to initiate interaction with the organization? | | | | | • | | • | |
| Do customers know the organization's privacy policies? | | | | • | | | • | • |
| Do customers know what identity information is shared with other service providers? | | | | • | | • | • | |
| Does the organization offer personalized services to customers? | • | • | | | • | • | • | |
| Does the organization offer customers device-independent access and single login? | • | • | • | | • | | • | • |
| Are customers able to self-service at least 80% of their queries? | • | • | | | • | • | • | • |
| Can a new customer be integrated into the organization and the information systems? | • | • | • | | | • | • | |
| Can secure access to a customer be easily enabled, regardless of device or platform? | • | • | | | | • | • | • |
| Does the organization track customer interaction and satisfaction in a comprehensive manner? | | • | | • | | • | • | |
| Can the organization collect trend and pattern data without knowing customer identities? | | | | | | • | • | • |
| Can the organization evaluate the lifetime value of customer relationships? | | | | | • | | | |
| Is there a customer portal that allows the organization to understand and provide better service for at least major customers? | • | • | • | • | • | • | • | • |
| Can partners and vendors offer services to the organization's customers without stealing them away? | • | | | • | • | • | • | • |
| Business Partners/Affiliates | | | | | | | | |
| Does the organization expend considerable resources integrating and supporting external partners and vendors? | | • | • | | | | • | |
| Can a new vendor be approved and integrated within 24 hours? | | | | | • | | | • |
| Is there a central process for managing partner and vendor access to organizational resources? | • | • | • | • | | | • | |
| Is there a scheme in place for ensuring non-repudiation? | | • | | | | | • | • |
| Is there a fraud prevention mechanism to protect the organization, customers and partners? | | • | | • | | | • | • |
| Can the organization quickly create affiliations with partners to provide complete service to customers? | • | • | • | • | • | • | • | |
| Can automatically qualified suppliers and vendors be included in the supply chain? | | • | • | | | | • | • |
| Can supplier sources be easily changed? | | • | | • | • | | | |
| Can a network of peer organizations be created to increase and retain the customer base and increase revenue generation opportunities? | | | | • | • | • | • | |
| Do preferred partners have access to planning and forecasting data through a partner portal? | | • | | • | • | • | • | • |

TABLE 3-continued

| Operational Capability | Network Identity Business Benefit | | | | | | | |
|---|---|---|---|---|---|---|---|---|
| | B1 | B2 | B3 | B4 | B5 | B6 | B7 | B8 |
| Does the organization offer partners device-independent access and single login? | • | • | • | | • | | • | • |
| Are employees able to access outsourced and affiliate vendors through the organization's own portal? | | | • | • | • | • | • | • |
| Doe the organization provide ancillary services to customers from its own portal? | • | • | | • | • | • | • | |

TABLE 4

| Operational Capability | Network Identity Technological Benefit | | | | |
|---|---|---|---|---|---|
| | B1 | B2 | B3 | B4 | B5 |
| Is the organization able to determine each person's level of access, and the services and data they can access? | • | | | • | • |
| Is the organization able to select interoperable identity management solutions from a variety of vendors? | • | • | • | • | • |
| Are the organization's technological solutions based on open standards? | • | • | • | • | |
| Does the organization have a way of reducing unauthorized intrusions? | | | | • | • |
| Does the organization have a sufficient security infrastructure for preventing fraud and identity theft? | | | | • | • |
| Is the organization capable of extending and integrating existing applications? | | | | • | • |
| Is the organization's administration of identity- and access-management efficient? | • | • | | | • |
| Is the organization able to support multiple devices and platforms without extensive reworking the technological infrastructure? | | • | • | • | • |
| Is the organization's identity administration requirements sufficiently supported? | • | • | • | • | • |
| Does the organization maintain multiple identity data stores (e.g., LDAP directories, databases, flat files)? | • | • | • | • | • |

Personnel in the four categories (i.e., personnel dealing with Employees, personnel dealing with Customers, personnel dealing with Business Partners and personnel dealing with Technological Infrastructure/Support) may simply indicate whether they believe the organization currently has the indicated capability. For example, they may answer yes or no to each capability question. By having a number of personnel in the different categories answer the capability questions, a measure of whether or how well the organization is providing the various benefits can be ascertained.

The various benefits and operational capabilities may be weighted or otherwise biased as appropriate. After each operational capability is examined, and the extent to which the associated benefits are being realized are noted, the results may be tabulated to determine the organization's current network identity capability. For example, a simple count may be made of the number of benefits currently being realized for the operational characteristics. The organization may then be assigned to one of the four phases of network identity capability described above.

FIG. 1 is a flowchart demonstrating a method of assessing an organization's network identity capability assessment, according to one embodiment of the invention.

In operation 102, it is determined whether a user (e.g., a customer, an employee, a business partner) is able to gain access to multiple applications and/or services without having to login or sign-on multiple times.

In operation 104, an examination is made into whether authentication and authorization are performed, and how they are performed, when a user attempts to access an application or service offered by the organization.

In operation 106, it is determined whether a user's access to an application or service is independent of the device or platform the user is operating. This operation may also involve a wider examination into the organization's technological infrastructure. This may be done to determine whether the organization employs established and/or open standards, whether the infrastructure will support the organization's desired network identity capability, etc.

In operation 108, the extent to which the organization protects users' identity data is examined. This may be part of a broader investigation of the organization's electronic security policies and/or practices.

In operation 110, it is determined whether the organization provides personalized and/or context-sensitive applications or services to users. The illustrated method then ends.

In one embodiment of the invention, a six-step method is provided to help an organization implement a federated network identity environment. Each step comprises a set of key activities, a set of deliverables and a set of associated values obtained by implementing the step.

The first step is an inventory and assessment step. Activities include the creation of an assessment team, while stressing collaboration and support from senior executive levels. This enables the assessment of identity requirements within the organization's application portfolio, technology infrastructure, business processes and relationships with partners and affiliates. Other activities include the prioritization of key projects that maximize organization value and the assessment of security mechanisms and policies for dealing with security breaches.

Deliverables in step one include defined objectives for identity management, including both strategic and tactical objective, and defined identities, roles and policies.

A value, or ROI, produced in step one is the identification of the following: redundant business processes, risks due to privacy violations and identity theft, and costs associated with lost employee productivity.

Step two is an architecture step, during which a flexible architecture that embraces a legacy environment is created and implemented. Also, network identity management infrastructure products, for implementing the architecture, are selected and identity integrity is established. In this step, deliverables include directory services and a network identity management infrastructure.

Value produced during step two includes the reduction of cost of identity management (e.g., due to centralized management of identity data) and the streamlining of business processes through common identity definitions. Also, employee productivity can be increased, and the availability of integrated data can reduce the burden of identity management on the workforce. Further value is provided in the form of improved data consistency across applications, identity information and access policies. And, an integrated identity management infrastructure facilitates the deployment of new applications.

In step three, an extension and delivery step, role-based and policy-based administration is introduced and policy-driven provisioning is implemented. This step delivers extended directory services, to reach web channels, wireless clients, and so on, to cover the full spectrum of the organization's applications. Further, role-based security and access to applications and services is enabled, as is the delegation of administration capability. Efficiencies are obtained through the implementation of enhanced, simplified end-user access.

The value of step three can be seen in reduced costs resulting from identity theft and privacy violations and reduced administrative workload resulting from role-based, policy-based and delegated administration. Further, user experiences can be enriched by personalized content and next-generation role-based web services are facilitated. Also, the organization is better positioned to comply with relevant legislation.

Step four is directed toward distinguishing business logic, and involves the decoupling of user and device identity information from applications and services. A mechanism is implemented for integrating delivery of on-demand web services. Collaborative business and technological relationships are built with partners and customers, and advantage can be taken of affiliates' marketing opportunities. Further, a portal and identity management framework is established for delivering value-added services, and the status of business logic and technology implementation are assessed.

From step four, dynamically configurable access and delivery of applications and services are enabled, and most network identity benefits are achieved (e.g., single login, privacy, security). Identity-centric relationships with business partners are built, and "circles of trust" are enabled.

Value is produced in step four by reducing costs associated with the management of dedicated infrastructures required for delivering services, and reducing the costs of development and deployment. Also, time to market for on-demand services can be accelerated, thereby producing increased revenue opportunities.

In step five, an implementation step, trusted communications between supply chain partners are implemented, and the organization is configured to utilize identity provider services. A circle of trust can be built, and partners or affiliates can be attracted or retained due to increased functionality. High-value transactions are automated, and the organization becomes more attractive through broadened web application access.

The organization receives value including increased revenue through collaboration with partners, additional system performance and increased throughput (e.g., due to the elimination of any need for multiple logins or sign-ons). Also, the number of fraudulent transactions is decreased.

In step six, the delivery step, the organization may participate in a federated network identity circle of trust (e.g., multiple circles of trust that are linked). This step delivers full capability to leverage free and open markets, and implements a single federated login. Services can be aggregated among a network of affiliates or partners. Shareholder value is increased through the creation of a very efficient value chain, increased employee productivity and the generation of incremental revenue. Multi-party commerce synchronicity is achieved, digital trust is improved via increased security, and customers can be offered extended services and seamless movement among business partners in one or more circles of trust.

Figure 2:
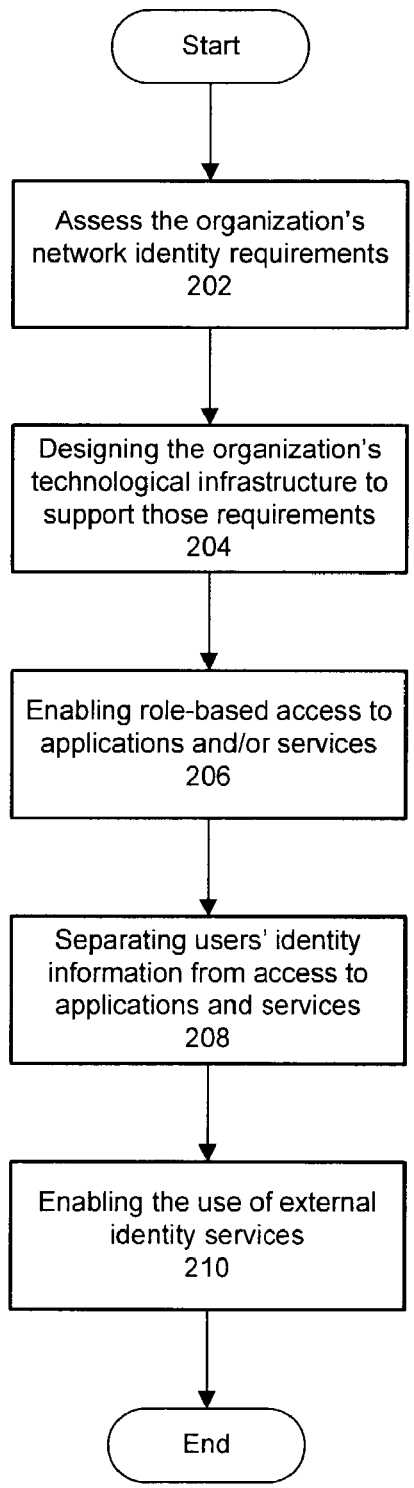
FIG. 2 is a flowchart illustrating one method of improving or implementing an organization's network identity capability, in accordance with an embodiment of the invention.

FIG. 2 demonstrates a method of implementing or improving an organization's network identity capability, according to one embodiment of the invention.

In operation 202, the organization's network identity requirements are assessed. This may entail an examination of the organization's relationships with various types of users (e.g., employees, customers, business partners) and how they use the organization's applications and/or services.

In operation 204, the organization's technological infrastructure is designed or redesigned to support the network identity requirements. This may entail implementing support for different types of devices or platforms.

In operation 206, role-based access to the organization's applications and services is enabled. This may include the definition and implementation of any number of roles, as well as a suitable system for managing those roles.

In operation 208, access to the applications and services is separated from users' identity data needed to enable their access to the applications and services.

In operation 210, the use of external identity services is enabled. For example, a trusted relationship (e.g., a circle of trust) may be established with an external identity service provider. The illustrated method then ends.

A Tool for Assessing Network Identity Capability

In one embodiment of the invention, a tool or utility (e.g., a software program) is provided for assessing an organization's network identity capability. The tool may also facilitate the prioritization of network identity benefits, to help the organization focus on the benefits that are most important to the organization.

For example, in one implementation of the tool, a senior member of the organization prioritizes the eight business benefits of Table 1 and the five technological benefits of Table 2. Then, other members of the organization from the four categories addressed above (i.e., personnel dealing with Employees, personnel dealing with Customers, personnel dealing with Business Partners and personnel dealing with Technological Infrastructure) do the same. This allows the tool to show any conflicting priorities that different personnel have assigned the benefits.

The tool may then help determine the extent to which a benefit is realized by the organization, rather than just whether the benefit is realized at all. The extent to which a benefit is realized may be measured by surveying people in different areas of, or with different relationships with, the organization. The surveys may elicit the respondents' agreement with various assertions regarding whether or not the organization implements certain measures that enable the benefits.

Some versions of the tool may track methods of assessing network identity capability described in the preceding section to varying degrees. Other versions may explore benefits of network identity not described above, and/or may explore the benefits more deeply than described above.

Embodiments of a network identity capability assessment tool described in this section may operate with varying degrees of similarity to methods of network identity capability assessment described in the previous section. Some of the terminology or concepts of network identity may be used somewhat differently in this section, including "benefits" and "capabilities."

In one embodiment of a tool, the "benefits" of a network identity capable environment comprise the business and technological benefits identified in Table 1 and Table 2. However, for purposes of conducting surveys, this embodiment of the tool may apply different labels or definitions, as shown in Table 5 (corresponding to Table 1) and Table 6 (corresponding to Table 2).

TABLE 5

| Business Benefit | Label used by Tool | Definition |
|---|---|---|
| B1. Device Independence | Universal connectivity | Functionality and services are delivered independently of the device used to access them. |
| B2. Ease of Management | Reduced operations cost | Streamlined management and efficient communication between employees, customers and partners. |
| B3. Ease of Integration | Productivity and efficiency of business processes | Ability to offer services that are not restricted by operational or technology constraints. |
| B4. Increased Intelligence | Timely business intelligence | Ability to deepen relationships with employees, customers and partners by learning more about them in a non-intrusive manner. |
| B5. Personalized Service | Quality of service to end users | Ability to provide context-sensitive, timely services to enhance customer experience. |
| B6. Privacy Protection | Trust and privacy of end users | Privacy is ensured by meeting legislated requirements and the ability to provide identity information at the time of engagement. |
| B7. Secure Access | Comprehensive security | Fully authenticated and authorized access. Trust relationship is complete. |
| B8. Single Login or Sign-on | Convenience for end users | Allow single sign-on to multiple applications, thereby enhancing user productivity and minimizing identity administration |

TABLE 6

| Technological Benefit | Label used by Tool | Definition |
|---|---|---|
| T1. Choice and Control | Choice and control over technology | The flexibility to integrate and incorporate applications without increasing administrative overhead. |
| T2. Financial and Effectiveness | Financial effectiveness | Reduced costs and improved ROI as well as better management of resources. |
| T3. Interoperability and Efficiency | Interoperability and efficiency of IT solutions | Improved productivity in managing and deploying applications. Reduced time to market for services. |
| T4. Risk Management | Risk management | Reduced risks of identity theft and fraudulent transactions. |
| T5. Security and Provisioning | Security and ease of provisioning | Integrated security. |

In the previous section, the "capabilities" of an enterprise were measured by a set of operational capability questions described in Table 3 and Table 4. Each question was intended to provide a yes or no answer as to whether a particular benefit was being realized. In one embodiment of the tool, the operational capability questions are replaced by a set of assertions that map 1:1 with the marked cells of Table 3 and Table 4. Each marked cell indicates that the indicated operational capability enables the corresponding Benefit.

In particular, refined sets of assertions are created for each marked cell in Tables 3 and 4 (i.e., each cell that has a '•'). For example, one operational capability question in Table 3 under the Employee category is "Do employees need only a single login to access all applications?" In an embodiment of the tool, this question may be decomposed into a set of six separate assertions corresponding to benefits B1, B2, B3, B5, B5, and B8. Thus one operational capability question in a method described in the previous section can be manifested as one or more capability assertions in an embodiment of a network identity capability assessment tool described in this section.

It may not be necessary to create refined capability assertions for every intersection of an operational capability question and Benefit in Tables 3 and 4. Common sense judgment may be applied to eliminate duplicate or nearly identical questions.

Breaking down the operational capability questions in Tables 3 and 4 into a set of refined capability assertions enables one to measure the extent to which each capability is exercised, as opposed to gaining only a binary yes/no response indicating whether or not an optimal state has been achieved. This introduces a $3^{rd}$ dimension (i.e., depth) to each intersection of a capability with a benefit.

The organizational areas examined with the tool are the same as the categories described in the previous section (i.e., employee, customer, partner, and IT). To further clarify, an organizational area represents the interaction of an organization with its employees, its customers or its partners, or the organization's use of Information Technology. An organizational area may be used to identify and administer a specific set of capability assertions that are relevant to the organizational area.

In order to simplify operations of the tool and to make resulting reports easy to read, the "low-level" capability assertions of an organizational area may be organized into "topics" (e.g., "high-level" capabilities) that are relevant to that area. Thus, while a survey participant from the Employee organizational area receives a set of assertions dealing with employees in the context of network identity, those assertions may be grouped by high-level capabilities or topics. This helps eliminates the monotony of the survey and helps survey participants understand the meaning of the capability assertions in the context of their day-to-day operations.

The following table, Table 7, demonstrates illustrative assertions that may be applied to test the extent to which an organization has implemented high-level capabilities of "Ease of Access" and "Interface Independence" to achieve the related network identity benefits of "Comprehensive Security" and "Universal Connectivity."

TABLE 7

| | Ease of Access | Interface Independence |
|---|---|---|
| Comprehensive Security | Employees have secure access to all appropriate applications. | One interface provides secure access to all applications. |
| Universal Connectivity | Multiple types of devices can be used to access applications. | Multiple access devices can be managed from a single unified interface. |

One part of the analysis of survey results, as described below, reports the organization's network identity capability in terms of these topics. Another part of the analysis uses the fact that each capability assertion has a direct correlation with a benefit offered by network identity (e.g., the benefits of Table 5 and Table 6)

Further, instead of limiting the assessment of network identity capability to just one organization, the tool may be used to assess the network identity capability of allied organizations or multiple organizations within an industry. For example, the network identity capability of business partners participating in a circle of trust (discussed in the previous section) may be collectively assessed.

Figure 3:
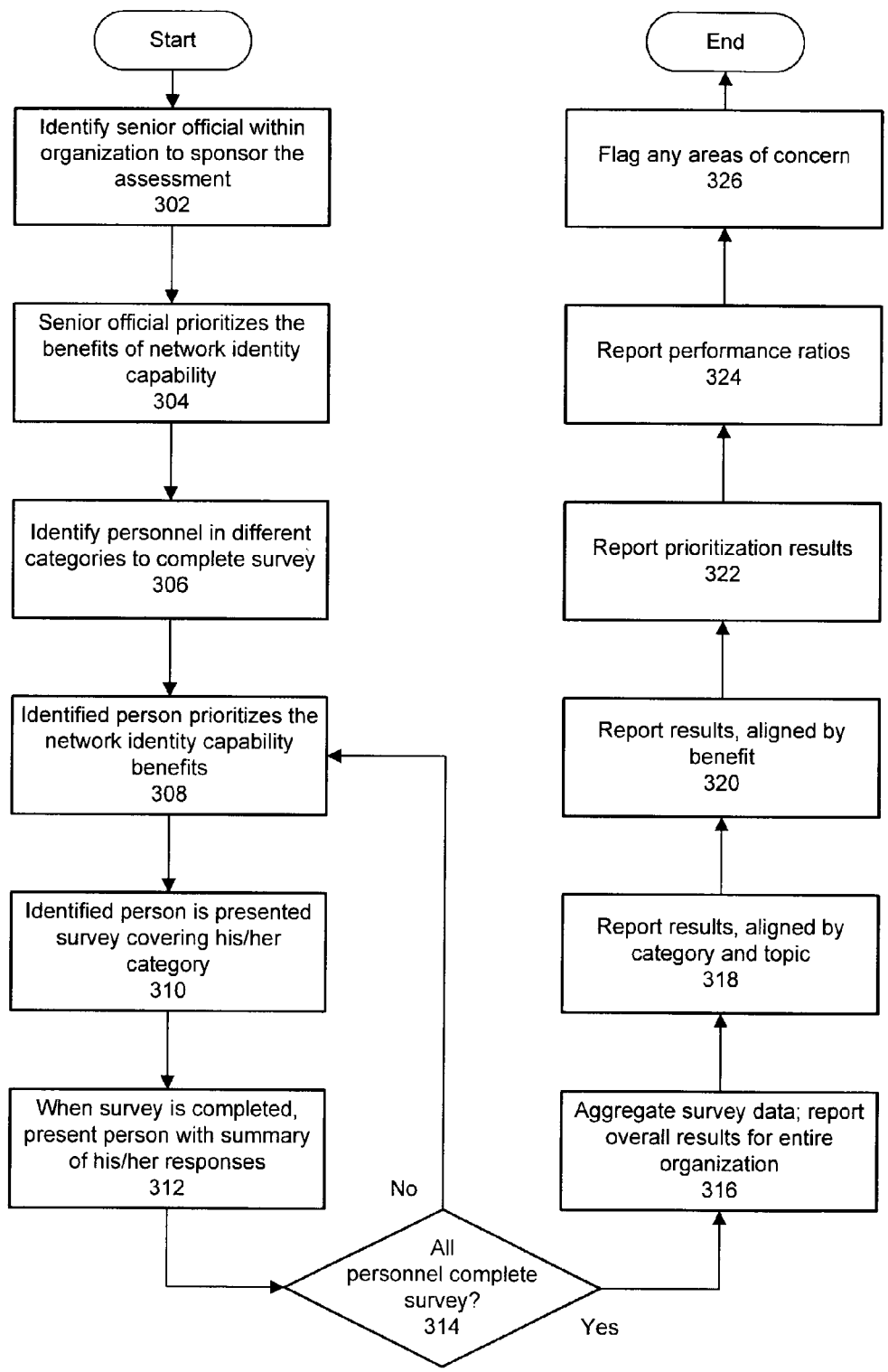
FIG. 3 is a flowchart demonstrating how a software tool may assess an organization's network capability, according to one embodiment of the invention.

FIG. 3 demonstrates how a tool may be implemented to assess an organization's network identity capability, according to one embodiment of the invention. The organization may be any type of enterprise. The organization may be a top-level entity, such as a conglomerate, or may be a business unit or subsidiary of another entity.

In operation 302, a senior official in the organization is selected to sponsor the network identity capability assessment. A senior official is a person with the authority to identify the organization's priorities and task individual employees, customers and business partners to complete a survey as part of the assessment. The official is assigned a code or key, which will be used to identify all surveys for the organization. The code or key is unique and will be used to group data to conduct mathematical calculations. Illustratively, an electronic mail note with the unique code is sent to the senior official, and he or she is given an opportunity to send an automatically generated email to selected personnel to have them complete a survey (as described below).

In operation 304, the senior official prioritizes a list of benefits that are achievable with sufficient network identity capability, in terms of their importance to the organization. In this embodiment, the benefits that are prioritized are the eight business and five technological benefits described in Tables 5 and 6, respectively, and the senior official's responses are considered a proxy for the organization. Alternatively, multiple senior officials may determine the organization's priorities. In other embodiments, benefits other than those listed in Tables 5 and 6 may be explored.

The senior official(s) need not provide an absolute ranking of each benefit (i.e., from one to thirteen). In other words, multiple benefits may be considered equally important to the organization and therefore assigned equal priorities.

In operation 306, the senior official identifies a number of people to complete a survey designed to investigate the organization's network identity capability. The senior official himself may also take the survey. In this embodiment, at least one individual in each of the following four categories or organizational areas is nominated: employees, customers, business partners, technological infrastructure/support.

In general, the more survey-takers that are nominated, the more accurate the end results will be. Having at least three or four respondents in each category may be sufficient.

In operation 308, a person identified by the senior official is contacted. For example, she may receive an electronic mail note containing the survey or directing her to access a particular web page. Based on the person's role or position she is first asked to prioritize either the eight business benefits (if she deals with employees, customers or business partners) or the five technological benefits (if she deals with the technological infrastructure of the organization).

In operation 310, the person completes a survey customized for the person's category or organizational area. Thus, the person may be posited a series of refined capability assertions as described above, but only for her organizational area.

Illustratively, a survey comprises any number (e.g., 50) of assertions describing an optimal state for a particular network identity capability. Possible examples include: "Employees have secure access to all appropriate applications" and "Multiple types of devices can be used to access applications." These assertions may be derived from operational capabilities listed in Tables 3 and 4.

For each assertion, the respondent indicates the degree or extent to which she believes the organization has reached the described state. Her response may be indicated on any suitable scale (e.g., from 1 to 5, with 5 indicating belief that the organization has reached that state.

As described above, the survey may be divided into meaningful topics (e.g., "high-level" capabilities), with each topic comprising one or more related assertions (e.g., "low-level" capabilities). Thus, the example assertions "Employees have secure access to all appropriate applications" and "Multiple types of devices can be used to access applications" may be considered low-level components of the topic "Ease of Access."

In operation 312, after the person completes the survey, she is presented with a summary of her responses. This summary may be in virtually any form, and may indicate which phase of network identity capability the person places the organization, based on her answers. Above, in the preceding section, four phases of network identity capability were described. The summary may simply be provided to give the person some feedback, and the person may or may not be given an opportunity to change a response.

In operation 314, it is determined whether all identified survey participants have completed their surveys. If not, the method returns to operation 308.

Otherwise, after all surveys have been completed, or after some threshold number have been completed, the survey data are aggregated in operation 316. All responses, from all survey participants, across all categories, are used to produce an overall score or indication of the organization's network identity capability.

The overall score may be used to place the organization into one of the four phases of network identity capability described in the previous section. The correlation between the aggregate score and phases of network identity capability may be scaled as desired. Illustratively, all respondents' answers, for all assertions, are averaged, and a polynomial equation is used to weight the final result. Thus, the difference between scores corresponding to phases one and two may be less than the difference between scores corresponding to phases three and four.

At this point, only the participants' responses to the capability assertions are considered, not the priorities that were placed on the various benefits.

In operation 318, survey responses in each of the four categories or organizational areas (i.e., employees, customers, business partners, IT or technological support) are aggregated to produce scores for each category. This enables an indication as to the phase of network identity capability that the organization enjoys in each separate category.

The tool provides two kinds of capability analysis: at the organizational area level and at the topic level. A score at the organizational area level is determined by the responses to all the assertions in the organizational area averaged over the number of respondents in that organizational area. This average is then used to select an appropriate stage of network identity evolution, as described in the previous section.

A topic score is calculated by collecting the responses to all the assertions that belong to the topic, weighting them and averaging them over the number of respondents in the organizational area. It is possible for an organization's overall network identity capability to be lower than a particular organizational area's. This is due to the averaging of capability scores across all organizational areas. Although capability scores are not generated for individual low-level capabilities in this embodiment of the invention, in other embodiments, they may.

In operation 320, scores for each benefit (e.g., the benefits listed in Tables 5 and 6) are reported. To determine the benefit scores, the scores of the low-level capabilities that relate to each benefit are weighted and averaged. As with the high-level capability (i.e., topic) scores produced in operation 318, the benefit scores indicate the extent to which each benefit is currently being realized. The scores may be expressed as percentages or in some other form.

In operation 322, a priority alignment report is provided to compare the senior official's indication of the organization's priorities for the network identity benefits against the survey respondents' priorities. Thus, differences in perceptions between the organization as a whole and individual participants can be easily identified. Illustratively, the priorities assigned by the sponsor serve as a proxy for the organization as a whole, and the collective priorities assigned by the participants are calculated utilizing the mathematical mode function. The differences are then analyzed, generating a report with recommendations outlining corrective steps, if any.

In operation 324, performance ratios are reported to measure how an organization's current network identity capabilities align with their desired level of benefit from network identity as indicated by priority value assigned to that benefit. A ratio may be derived by dividing the priority value assigned to the benefit that the organization wishes to attain by the score of that benefit, as calculated in operation 320. In one embodiment of the tool, the priority value used in the calculation is the higher of the two values: (a) the priority assigned by the sponsor (as proxy for organizational priority) or (b) the aggregate priority calculated from responses of all participants.

The capability assertions designed in the tool have linkages to the network identity benefits that they enable. This allows the organization to consider which network identity benefits it receives when it implements particular capabilities. However, the extent to which the organization is deemed to realize the benefit depends on the survey responses to the relevant capability assertions.

A ratio of 1:1 indicates that the organization's capability matches its priority for that capability. A high ratio (e.g., N:1, where N>1) indicates the organization is over-performing with regard to the capability, and that resources may be over-allocated or misdirected. A low ratio (e.g., 1:N, where N>1) indicates the organization is under-performing with regard to the capability.

In operation 326, any areas of concern are flagged for the organization's attention. For example, concern may be expressed if the organization is deemed to be less than 10% capable of providing a benefit (e.g., from Table 5 or Table 6), or if any performance ratio is less than 20%, etc.

The illustrated method then ends. In other embodiments, a tool may be configured to provide more or fewer reports, or to report different content in different ways.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of implementing network identity capability within an organization, the method comprising:
   assessing the organization's identity capabilities regarding the organization's employees, customers, technology infrastructure, and relationships with business partners;
   assessing the organization's identity requirements regarding the employees, customers, technology infrastructure and relationships with business partners;
   redesigning said technology infrastructure to accommodate said identity requirements, wherein said redesigning involves establishing a set of common identity definitions for use within the technology infrastructure, said services and the relationships with said business partners;
   enabling role-based access to services offered by the organization;
   decoupling users' identity information from the users' access to said services, wherein the users include at least the employees and the customers, wherein said decoupling users' identity comprises enabling users to access a plurality of said services offered by the organization after a single authentication of the users' identity; and
   obtaining user identity information from a trusted identity provider service external to the organization.

2. The method of claim 1, wherein said assessing the organization's identity capabilities comprises:
   determining how user identity information is used within the technology infrastructure, said services and the relationships with said business partners.

3. The method of claim 1, further comprising:
   identifying one or more redundant business processes within said services.

4. The method of claim 1, further comprising:
   centralizing the administration of identity data concerning the users.

5. The method of claim 1, wherein said enabling comprises:
   implementing policy-driven provisioning of said services offered by the organization.

6. The method of claim 1, further comprising:
   delegating administration of identity data concerning the users.

7. The method of claim 1, further comprising:
   establishing identity-centered collaborations with one or more of said business partners.

8. The method of claim 1, wherein said obtaining comprises:
   establishing trusted communication with said trusted identity service provider.

9. The method of claim 1, further comprising:
   establishing a trusted relationship with one or more of said business partners, wherein said trusted relationship allows a user to access services of the organization and the one or more business partners with a single authentication of the user's identity.

10. A computer readable storage medium storing instructions that, when executed by a computer, cause the computer to perform a method of implementing network identity capability within an organization, the method comprising:
    assessing the organization's identity capabilities regarding the organization's employees, customers, technology infrastructure, and relationships with business partners;
    assessing the organization's identity requirements regarding the employees, customers, technology infrastructure and relationships with business partners;
    redesigning said technology infrastructure to accommodate said identity requirements, wherein said redesigning involves establishing a set of common identity definitions for use within the technology infrastructure, said services and the relationships with said business partners;
    enabling role-based access to services offered by the organization;
    decoupling users' identity information from the users' access to said services, wherein the users include at least the employees and the customers, wherein said decoupling users' identity comprises enabling users to access a plurality of said services offered by the organization after a single authentication of the users' identity; and
    obtaining user identity information from a trusted identity provider service external to the organization.

* * * * *